(12) United States Patent
Yanagi

(10) Patent No.: US 9,041,590 B2
(45) Date of Patent: May 26, 2015

(54) DEVICE AND METHOD FOR CONTROLLING TRACKING INFORMATION, AND RADAR DEVICE

(75) Inventor: Katsuyuki Yanagi, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 460 days.

(21) Appl. No.: 13/494,052

(22) Filed: Jun. 12, 2012

(65) Prior Publication Data

US 2012/0313807 A1 Dec. 13, 2012

(30) Foreign Application Priority Data

Jun. 13, 2011 (JP) ................................. 2011-131233

(51) Int. Cl.
*G01S 13/00* (2006.01)
*G01S 13/87* (2006.01)
*G01S 7/04* (2006.01)
*G01S 13/72* (2006.01)

(52) U.S. Cl.
CPC ............. *G01S 13/878* (2013.01); *G01S 13/003* (2013.01); *G01S 13/872* (2013.01); *G01S 7/04* (2013.01); *G01S 13/726* (2013.01)

(58) Field of Classification Search
CPC ....... G01S 13/872; G01S 13/003; G01S 7/04; G01S 13/726
USPC .......................................................... 342/59
See application file for complete search history.

(56) References Cited

U.S. PATENT DOCUMENTS

| | | | | |
|---|---|---|---|---|
| 4,050,068 A | * | 9/1977 | Berg et al. ........................ | 342/53 |
| 2004/0130480 A1 | * | 7/2004 | Hellsten .......................... | 342/59 |
| 2010/0295719 A1 | * | 11/2010 | Habib et al. .................... | 342/36 |

FOREIGN PATENT DOCUMENTS

| | | |
|---|---|---|
| EP | 2149857 A1 | 2/2010 |
| JP | 63-201581 A | 8/1988 |
| JP | 02-141687 A | 5/1990 |
| JP | 08-313617 A | 11/1996 |
| JP | 11-183614 A | 7/1999 |
| JP | 2002-277533 A | 9/2002 |
| JP | 2002-341014 A | 11/2002 |
| JP | 2009-122063 A | 6/2009 |

OTHER PUBLICATIONS

Extended European Search Report for European Application No. 12171098.2, dated Sep. 21, 2012.

* cited by examiner

*Primary Examiner* — Frank J McGue
(74) *Attorney, Agent, or Firm* — Global IP Counselors, LLP

(57) ABSTRACT

This disclosure provides a tracking information control device. The device includes a receiver for receiving, from two radar devices, data relating to a target echo received by a radar antenna of one of the radar devices, and data relating to a target echo received by a radar antenna of the other radar device, the data being obtained from tracking the target echoes, respectively, a determiner for determining whether the target echoes indicate the same target object, an ID applier for applying the same ID to the target echoes when the determiner determines that the target echoes indicate the same target object, and a transmitter for transmitting the same IDs to the radar devices in order to inform whether the target echoes displayed by the radar devices, respectively, indicate the same target object.

19 Claims, 12 Drawing Sheets

| NAME OF TARGET OBEJCT | GLOBAL ID | LOCAL ID IN FIRST RADAR DEVICE | LOCAL ID IN SECOND RADAR DEVICE |
|---|---|---|---|
| TARGET OBJECT A | G3 | L11 | — |
| TARGET OBJECT B | G2 | L12 | L21 |
| TARGET OBJECT C | G1 | — | L22 |

FIG. 5

| CONDITION ITEM | CONTENT OF CONDITION |
|---|---|
| DISTANCE DIFFERENCE | WITHIN DDD NAUTICAL MILES |
| AZIMUTH DIFFERENCE | WITHIN AAA DEGREES |
| SPEED DIFFERENCE | WITHIN SSS KNOTS |
| COURSE DIFFERENCE | WITHIN CCC DEGREES |

FIG. 6

| RELATIVE SPEED OF TARGET OBJECT | | | |
|---|---|---|---|
| NAME OF TARGET OBJECT | DATA DETECTED BY FIRST RADAR DEVICE | DATA DETECTED BY SECOND RADAR DEVICE | ESTIMATED DATA |
| TARGET OBJECT B | 10 KNOTS | 11 KNOTS | 10.5 KNOTS |

FIG. 7A

| RELATIVE SPEED OF TARGET OBJECT | | | |
|---|---|---|---|
| NAME OF TARGET OBJECT | DATA DETECTED BY FIRST RADAR DEVICE | DATA DETECTED BY SECOND RADAR DEVICE | ESTIMATED DATA |
| TARGET OBJECT B | 10 KNOTS | 11 KNOTS | 10 KNOTS |

FIG. 7B

SCREEN IMAGE OF FIRST RADAR DEVICE

SCREEN IMAGE OF SECOND RADAR DEVICE

SCREEN IMAGE OF FIRST RADAR DEVICE

SCREEN IMAGE OF SECOND RADAR DEVICE

SCREEN IMAGE OF FIRST RADAR DEVICE

SCREEN IMAGE OF SECOND RADAR DEVICE

SCREEN IMAGE OF FIRST RADAR DEVICE

SCREEN IMAGE OF SECOND RADAR DEVICE

DEVICE AND METHOD FOR CONTROLLING TRACKING INFORMATION, AND RADAR DEVICE

CROSS-REFERENCE TO RELATED APPLICATION(S)

The application claims priority under 35 U.S.C. §119 to Japanese Patent Application No. 2011-131233, which was filed on Jun. 13, 2011 the entire disclosure of which is hereby incorporated by reference.

TECHNICAL FIELD

The present invention relates to a tracking information control device for controlling tracking information that is obtained based on an echo acquired by a radar antenna.

BACKGROUND OF THE INVENTION

Conventionally, various navigation devices have been developed in view of prevention of collision between ships and safety of life. For example, a radar device having a TT (Target Tracking) function has been known as such a navigation device. Here, simply put, the TT function is for detecting a position and a velocity vector of a target object that exists around a ship concerned, based on a transition of a radar image obtained previously. JP2009-122063A discloses a configuration including two radar devices having the TT function.

The two radar devices disclosed in JP2009-122063A form a configuration in which one of the radar devices displays information acquired by the other radar device. For example, when the radar device cannot appropriately acquire TT information due to influence of clutter, an operator selects a target from a radar image displayed by the other radar device and, thus, the corresponding target can be displayed by the radar device.

However, with the configuration of JP2009-122063A, the target is displayed in different forms between the two radar devices. Therefore, it has not been able to instantly determine the target displayed by the other radar device which corresponds to the target that is not displayed appropriately by the radar device.

SUMMARY OF THE INVENTION

Thus, the present invention is made in view of the above situations, and provides radar devices that can display tracking information matched therebetween.

According to an aspect of the invention, a tracking information control device is provided. The device includes a receiver for receiving, from two radar devices, data relating to a target echo received by a radar antenna of one of the radar devices, and data relating to a target echo received by a radar antenna of the other radar device, the data being obtained from tracking the target echoes, respectively. The device also includes a determiner for determining whether the target echoes indicate the same target object. The device also includes an ID applier for applying the same ID to the target echoes when the determiner determines that the target echoes indicate the same target object. The device also includes a transmitter for transmitting the same IDs to the radar devices in order to inform whether the target echoes displayed by the radar devices, respectively, indicate the same target object.

In this manner, the same ID can be applied to the target echoes indicating the same target object. Therefore, the target echoes indicating the same target object can be displayed in the same display mode (same reference numeral, letter, mark, etc.) even between the different radar apparatuses. Thus, the information that is in match can be provided to a plurality of operators in work similar to each other.

The determiner may determine whether the target echoes indicate the same target object, based on at least one of positions, speeds, and courses of the target echoes.

In this manner, it can be determined whether the target echoes indicate the same target object by using the data that can be acquired by tracking the target echoes. Therefore, no other data is particularly required in determining whether the target echoes indicate the same target object and, thus, the processing can be simplified.

The tracking information control device may also include a data estimator for estimating a data of the target echoes, when the target echoes indicate the same target object, data of the same target object based on at least one of the data of the target echoes. The transmitter may transmit the data of the same target object estimated by the data estimator to at least one of the radar devices.

In this manner, the estimation based on the data acquired by a plurality of radar devices can be performed. Thus, the data of the target object can be estimated accurately.

The data estimator may estimate the data of the same target object by averaging the data of the target echoes.

In this manner, the data of the target object can be estimated accurately while simplifying the processing performed by the data estimator.

A priority order may be set between the radar antennas, and the data estimator may use either one of the data of the target echoes obtained from the radar antennas as an estimated value of the data of the same target object based on the priority order In this manner, for example, by prioritizing the radar antenna with high performance or with good installation condition, the frequency of such a radar antenna being used increases, and as a result, the data of the target object can be estimated accurately.

When one of the radar devices detects that the target echo currently tracked thereby is close to reach outside a target detectable range of the radar device, a determination of whether this target object is tracked by the other radar device may be performed, and when this target object is not tracked by the other radar device and if the other radar device is able to detect this target object, the other radar device may be instructed to start tracking this target object.

In this manner, the tracking of the target echo can be taken over. Particularly, with the above configuration, the same ID can be applied to the target echoes indicating the same target object. Thus, the tracking of the target echo can be taken over smoothly between the radar devices.

The ID applier may be provided in one of the radar devices.

In this manner, in a case of forming a system including radar devices and the tracking information control device, the entire configuration can be compact comparing to when arranging the tracking information control device outside the radar devices.

According to another aspect of the invention, a tracking information control system is provided. The system includes the tracking information control device of any of the above aspects, and the plurality of radar devices.

In this manner, the tracking information control system that can exert the effects described above can be realized.

The tracking information control system may have a configuration including the radar device including a tracking information control device of any of the above aspects, and one or more of other radar devices.

In this manner, the configuration of the tracking information control system can be compact comparing to when arranging the tracking information control device outside the radar devices.

When one of the target echoes detected by two of the radar devices is selected by one of the two radar devices, the selection of the target echo may be informed to the other one of the two radar devices.

In this manner, for example when a plurality of operators view the display units of the radar devices, respectively, any one of the operators can instinctively and instantly grasp the target echo observed by the other operator.

When one of the target echoes detected by two of the radar devices is selected by one of the two radar devices, numerical information on the selected target echo may be displayed by both of the two radar devices.

In this manner, for example when a plurality of operators view the display units of the radar devices, respectively, the operator can grasp the target echo observed by the other operator along with the numerical information of the target echo. Thus, for example, if the target object has a possibility of colliding with the radar device, the radar device can be informed with the target echo of the target object along with its speed, course, etc. Therefore, the information is useful for collision avoidance.

According to still another aspect of the invention, a radar device is provided. The device includes a radar antenna, an acquirer for acquiring data relating to a target echo received by the radar antenna, by tracking the target echo, a communicator for transmitting the target echo to a tracking information control device where data relating to a target echo is controlled, and receiving, from the tracking information control device, an ID applied by an ID applier, the same ID being assigned for every target object, and a display unit for displaying the target echo in a display mode based on the ID.

In this manner, when the target echo of the radar device and a target echo of another radar device indicate the same target object, the target echoes can be displayed in the same display mode (same reference numeral, letter, mark, etc.). Thus, the information that is in match between the radar devices can be provided to a plurality of operators in work similar to each other.

The radar device may have a configuration including a radar antenna, an acquirer for acquiring data relating to a target echo received by the radar antenna, by tracking the target echo, a determiner for determining whether the target echo acquired by the radar antenna and a target echo acquired from another radar device indicate the same target object, an ID applier for applying the same ID to the target echoes when the determiner determines that the target echoes indicate the same target object, and a display unit for displaying the target echo in a display mode based on the ID.

In this manner, the entire configuration of the system can be compact comparing to when arranging the tracking information control device outside the radar devices.

The display unit may have a display mode where only the target echo acquired by the device where the display unit is provided is displayed.

In this manner, In this display mode, the target object that is currently under detection by the device can easily be grasped. Further, it can be prevented that a plurality of target objects detected only by the other radar device are also displayed and the target object which the operator wants to see is difficult to be recognized on the display unit.

The display unit may have a display mode where both the target echo acquired by the device where the display unit is provided and a target echo acquired by another radar device are displayed.

In this manner, the information of around the device where the display unit is provided can be grasped in detail by effectively using the plurality of radar devices.

The display unit may display both the target echo acquired by only the device where the display unit is provided and a target echo acquired by at least another radar device so that the target echoes are discriminated from each other.

In this manner, the operator can promptly grasp whether the observed target echo is the target echo acquired only by the device where the display unit is provided or the target echo acquired by at least the other radar device (the target echo acquired by both the device where the display unit is provided and the other radar device or only by the other radar device).

The display unit may display the target echo acquired by the device where the display unit is provided, with at least an ID (local ID) controlled and applied by the device where the display unit is provided so that the target echoes acquired by the device where the display unit is provided do not mix with each other, and the display unit may display the target echo acquired by at least the other radar device with at least the ID (global ID) applied by the ID applier.

In this manner, the operator can grasp whether the observed target echo is the target echo acquired only by the device where the display unit is provided or the target echo acquired by at least the other radar device, along with the applied ID.

When the target echo detected by both the device where the display unit is provided and another radar device is selected by the device where the display unit is provided, the selection of the target echo may be informed to the other radar device.

In this manner, for example when a plurality of operators view the display units of the radar devices, respectively, any one of the operators can instinctively and instantly grasp the target echo observed by the other operator.

When the target echo detected by both the device where the display unit is provided and another radar device is selected by the device where the display unit is provided, numerical information on the selected target echo may be displayed on the display unit, and the selection of the target echo may be informed to the other radar device so that the numerical information is also displayed by the other radar device.

In this manner, for example when a plurality of operators view the display units of the radar devices, respectively, the operator can grasp the target echo observed by the other operator along with the numerical information of the target echo. Thus, for example, if the target object has a possibility of colliding with the radar device, the radar device can be informed with the target echo of the target object along with its speed, course, etc. Therefore, the information is useful for collision avoidance.

A reference position for a relative position of the target echo may be set, and the relative position with respect to the reference position may be calculated based on a position of the radar antenna, and the reference position.

In this manner, the reference position for the relative position of the target echo is fixed; therefore, for example, it can be determined whether the target echoes indicate the same target object.

A terrestrial reference position of the target echo may be calculated based on a terrestrial reference position of the radar antenna.

In this manner, a position deviation of the target echo between the radar devices, caused by a difference in position where the radar antenna is installed, can be prevented without setting the reference position.

BRIEF DESCRIPTION OF THE DRAWINGS

The present disclosure is illustrated by way of example and not by way of limitation in the figures of the accompanying drawings, in which the like reference numeral indicate like elements and in which:

FIG. 5 is a table showing IDs applied to each target object;

FIG. 6 is a table showing an example of determination criteria of a determiner;

FIG. 7A is a table showing an example of estimation by a data estimator, and FIG. 7B is a table showing another example of estimation by the data estimator;

DETAILED DESCRIPTION

Figure 1:
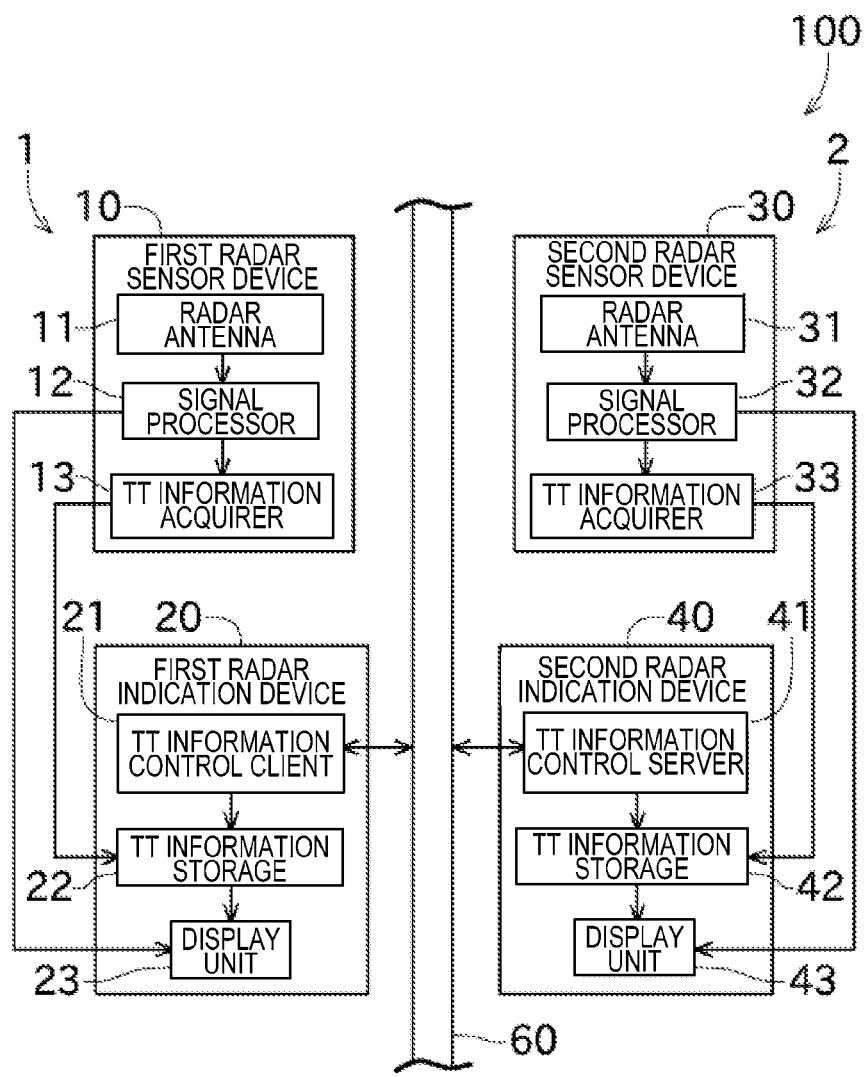
FIG. 1 is a block diagram showing a configuration of a TT information control system according to an embodiment of the present invention.
Figure 2:
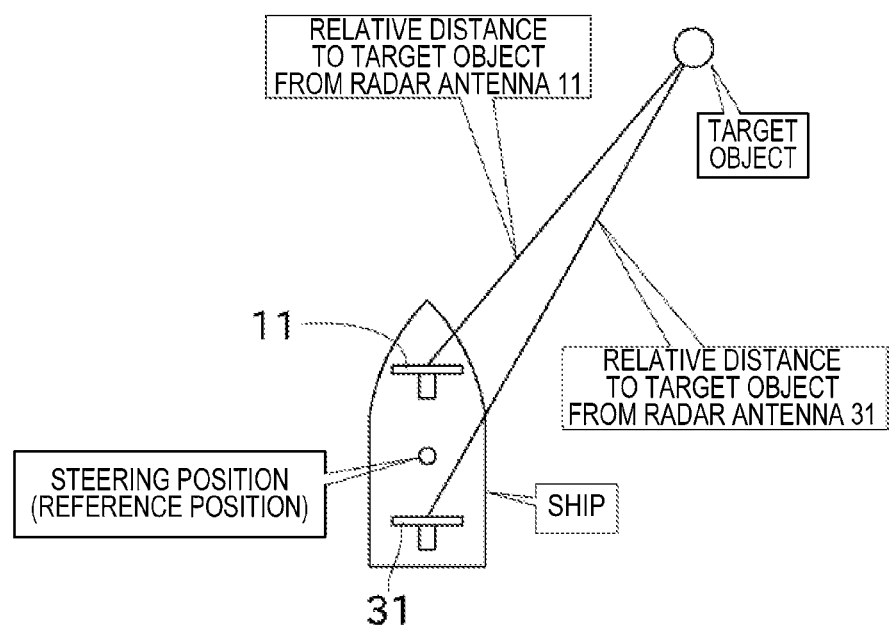
FIG. 2 is a view explaining a reference position for a relative position of a target object.

Next, an embodiment of the present invention is described with reference to the appended drawings. FIG. 1 is a block diagram showing a configuration of a TT information control system 100 (tracking information control system) according to this embodiment. FIG. 2 is a view explaining a reference position for a relative position of a target object (hereinafter, may simply be referred to as "the reference position").

The TT information control system 100 shown in FIG. 1 includes a first radar device 1 and a second radar device 2 connected with each other via a wired LAN 60 that allows a mutual communication between the devices. Note that, the number of radar devices constituting the TT information control system 100 is not limited to two and may be more.

First, the first radar device 1 and the second radar device 2 are explained. Note that, the first and second radar devices 1 and 2 are only partially different from each other (the first radar device 1 includes a TT information control client 21 but the second radar device 2 includes a TT information control server 41 instead); therefore, hereinafter, the first radar device 1 is explained on behalf of the radar devices, and the explanation of the configuration of the second radar device 2 may be omitted partially.

The first radar device 1 transmits an electric wave, receives a reflection wave from the target object, and performs a suitable calculation on the reflection wave to detect a position of the target object. Specifically, as shown FIG. 1, the radar device 1 includes a first radar sensor device 10 and a first radar instruction device 20.

The first radar sensor device 10 performs the transmission and reception of the electric wave and signal processing. The first radar sensor device 10 includes a radar antenna 11 (radar antenna), a signal processor 12, and a TT information acquirer 13 (acquirer).

The radar antenna 11 transmits a pulse-shaped microwave having a strong directivity, and receives an echo (reflection wave) that is the microwave reflected on and returned back from the target object. Further, the radar antenna 11 repeatedly transmits and receives the electric wave while horizontally revolving at a predetermined revolution speed. With the above configuration, a scan can be performed horizontally over 360° centering on a ship.

Note that, either one of a CW (continuous wave) radar and a pulse doppler radar may be used alternative to the pulse radar. Further, alternative to the above configuration, a radar device having a configuration in which the radar antenna does not revolve may be used. For example, the radar antenna is not required to revolve in any of a radar device having a configuration with antenna elements in the entire circumferential direction and a radar device for detecting only a particular direction (e.g., forward).

The signal processor 12 acquires a distance from the radar antenna 11 to the target object based on a time difference between a timing at which the microwave is transmitted from the radar antenna 11 and a timing at which the echo is received by the radar antenna 11. Further, the signal processor 12 acquires a direction to which the target object exists with respect to the radar antenna 11, from a facing direction of the radar antenna 11 when the echo is received (the direction that the microwave is transmitted to and received from). The signal processor 12 creates a radar image through the above acquisitions, and outputs it to the TT information acquirer 13 and the first radar instruction device 20.

The TT information acquirer 13 is for achieving a TT (Target Tracking) function. The detailed explanation of the TT (or ARPA) function is omitted because it has been known. The function estimates a velocity vector of the target object (target echo) by automatically detecting and acquiring the position of the target echo based on the radar image, and tracking the movement of the target echo based on a time transition of a change of the radar image.

Note that, the position of the target object acquired by the TT information acquirer 13 is relative information with respect to the radar antenna 11. Therefore, as shown in FIG. 2, when the installment position of the radar antenna differs between the first and second radar devices 1 and 2, even with the same target object, the relative position of the target object (target echo) differs between when it is acquired by the radar antenna 11 of the first radar device 1 and when it is acquired by a radar antenna 31 of the second radar device 2. Therefore, the TT information acquirer 13 changes the reference position for the relative position of the target echo. In this embodiment, a steering position (a position where the ship steering is performed) is set as the reference position, and the relative position is obtained with the steering position serving as a reference in each radar device. The information showing the relative position and speed of the target echo obtained as above (tracking information and TT information) is outputted to the first radar instruction device 20. Note that, the reference position may not be the steering position if a unique stable position is set. Further, a TT information acquirer 33 of the second radar device 2 also changes the reference position for the relative position based on a radar image created by a signal processor 32 of the second radar device 2, similar to the change by the TT information acquirer 13.

Note that, the first radar sensor 10 may acquire a terrestrial reference position (absolute position) of the target object as follows. A positional relation between a position where a GPS receiver is installed and a position where the radar antenna 11 is installed is obtained and stored in the first radar sensor 10 in advance. Thereby, an absolute position of the radar antenna 11 can be obtained based on the positional relation and an absolute position of the GPS receiver detected by itself. Further, a positional relation between the radar antenna 11 and the target object can be obtained as above based on the echo. Thus, the absolute position of the target object can be obtained. Note that, also in the case of obtaining the absolute position, similar to the case of obtaining the relative position, information indicating the absolute position is also transmitted to the first radar instruction device 20. Further, the second radar device 2 can similarly obtain the absolute position of the target object.

The first radar instruction device 20 includes the TT information control client 21 (communicator), a TT information storage 22, and a display unit 23, as its main components.

The TT information control client 21 functions as a client when the TT information is controlled by the TT information control system 100. On the other hand, the second radar device 2 is provided with the TT information control server 41 (tracking information control device) instead of the TT information control client 21. The TT information control server 41 functions as a server when the TT information is controlled by the TT information control system 100. For example, when the TT information control system 100 is constituted with three or more radar devices, one of the radar devices includes the TT information control server, and the rest of the radar devices include the TT information control clients. Note that, in this embodiment, the TT information control server 41 is provided in the radar device; however, the TT information control server 41 may be provided outside the radar device, and all of the radar devices may include the TT information control clients. Further, the functions of the TT information control client 21 and the TT information control server 41 are not necessarily fixed, and one or more of the TT information control clients 21 may serve as a TT information controller that can switch its function to the function of the TT information control server so that when, for example, the equipment for operating as the TT information control server breakdowns, any one of the other TT information control clients may operate as a substitute server. Note that, processing performed by the TT information control client 21 and the TT information control server 41 is described below in detail.

The TT information storage 22 stores the TT information acquired by the TT information acquirer 13. When the TT information acquirer 13 acquires a new target echo, TT information of the target echo is newly registered in the TT information storage 22. As for the target echo(s) of which TT information has already been registered in the TT information storage 22, the contents stored in the TT information storage 22 is updated every time new information is obtained. Further, a TT information storage 42 provided to the second radar device 2 stores the TT information acquired by the TT information acquirer 33 and updates the information similar to the TT information storage 22.

The display unit 23 is a liquid crystal display that can display in full color. The display unit 23 is inputted with the radar image created by the signal processor 12 and the stored contents in the TT information storage 22. Further, the display unit 23 can display the TT information and the radar image in a superimposed manner.

Figure 3:
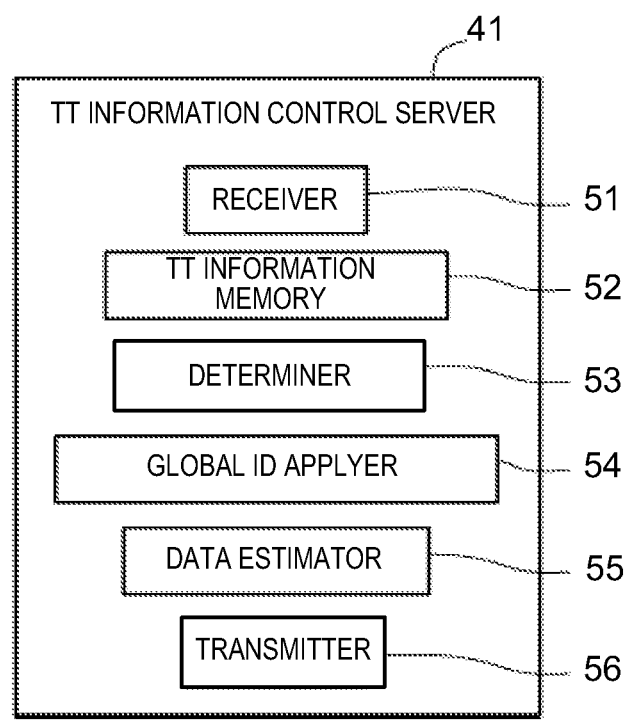
FIG. 3 is a block diagram showing a configuration of a TT information control server.
Figure 4:
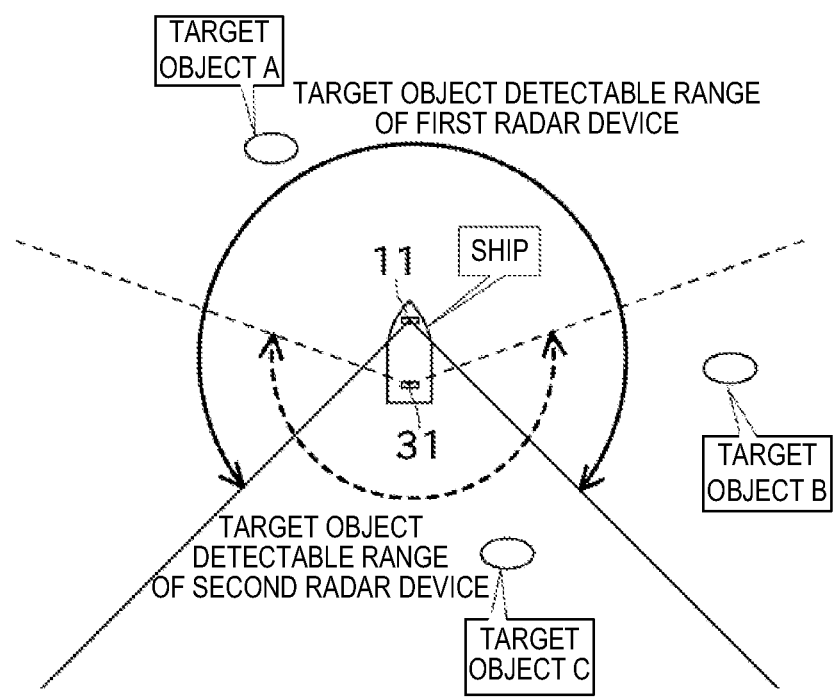
FIG. 4 is a view showing target object detectable ranges of a first radar device and a second radar device, respectively.

Next, the flow of the processing performed by the TT information control client 21 and the TT information control server 41 is mainly explained and the configuration for controlling the TT information is explained. FIG. 3 is a block diagram showing a configuration of the TT information control server 41. FIG. 4 is a view showing target object detectable ranges of the first radar device 1 and the second radar device 2, respectively. FIG. 5 is a table showing IDs applied to each target object. Note that, as shown in FIG. 3, the TT information control server 41 includes a receiver 51, a TT information memory 52, a determiner 53, a global ID applier 54 (ID applier), a data estimator 55, and a transmitter 56.

Hereinafter, as shown in FIG. 4, a situation is considered where target objects A, B and C exist around the ship, and each of target detectable ranges of the radar antennas provided to the first and second radar devices 1 and 2 is limited because the microwave transmitted therefrom is partially blocked by a structural object on the ship. Specifically, as shown in FIG. 4, the radar antenna 11 can detect target objects located other than a rearward area of the ship. On the other hand, the radar antenna 31 (radar antenna) provided to a second radar sensor device 30 can detect target objects located other than a forward area of the ship.

Therefore, the first radar device 1 can detect the target objects A and B, and whereas, the second radar device 2 can detect the target objects B and C. Note that, hereinafter, processing is explained, which is performed when the target objects B and C are detected by the second radar device 2 in advance and the target objects A and B are newly detected by the radar device 1. Note that, in the explanation below, echoes from the target objects A and B that are acquired by the first radar device 1 are referred to as the first target echoes A and B, respectively, and echoes from the target objects B and C that are acquired by the second radar device 2 are referred to as the second target echoes B' and C, respectively.

The TT information acquirer 13 of the first radar device 1 obtains TT information on the first target echoes A and B based on the radar image, and outputs it to the TT information storage 22. The TT information storage 22 is newly registered with the first target echoes A and B. Here, each target echo to be newly registered is applied with a local ID. The local ID is controlled by the device concerned (here, the first radar device 1) and applied so that the target echoes acquired by the device concerned do not mix with each other. Here, as shown in FIG. 5, the first target echo A is applied with "L11", and the first target echo B is applied with "L12." Note that, there is a possibility that the same local ID is used in other radar devices. Further, for the second target echoes B' and C that are the echoes from the target objects B and C detected by the second radar device 2, "L21" and "L22" are applied as the local IDs of the second radar device 2 in advance, respectively.

The TT information control client 21 acquires the TT information on the newly registered first target echoes A and B along with their local IDs from the TT information storage 22, and transmits them to the TT information control server 41.

The TT information and the local IDs are received by the receiver 51 of the TT information control server 41, and stored in the TT information memory 52 provided to the TT information control server 41. The TT information memory 52 is stored with, for example, local IDs of and TT information on the target echoes detected by all the radar devices constituting the TT information control system 100.

Further, the determiner 53 of the TT information control server 41 determines whether the same target objects corresponding to the received first target echoes A and B have already been registered in the TT information memory 52, based on the TT information received by the receiver 51. This determination is performed based on, for example, a table shown in FIG. 6. FIG. 6 is the table showing an example of determination criteria of the determiner 53. A distance difference, an azimuth difference, a speed difference, and a course difference between two target echoes to be observed (e.g., the first target echo B and the second target echo B') are set in FIG. 6 as condition items. Further, contents (thresholds) of conditions for the condition items are respectively described in the table. The determiner 53 determines that the two target echoes to be observed indicate the same target object when all of the four condition items are satisfied. Note that, this determination method is arbitrary and, for example, the determiner 53 may determine as the same target object when three of the condition items are satisfied. Further, the condition items used in this determination are not limited to the above examples and may include sizes and shapes (e.g., horizontal to vertical ratio) of the target echoes. Moreover, each of the thresholds corresponding to the condition items may be changed by an operator and, thereby, flexibly supports any situations.

In this manner, the determiner 53 determines the target object indicated by the target echoes. The global ID applier 54 provided to the TT information control server 41 applies the same ID (global ID) to the target echoes determined to correspond to the same target object. The global ID is an ID uniquely assigned in the TT information control system 100 for every target echo(es) indicating a single target object, and different IDs are applied to the target echoes indicating different target objects. Specifically, the target object A detected by the first radar device 1 is not registered in the TT information memory 52 yet because it is located outside the target object detectable range of the second radar device 2. Therefore, the first target echo A is applied with a new global ID (G3). On the other hand, the target object B detected by the first radar device 1 is detected by the radar device 2 in advance and registered in the TT information memory 52. Therefore, the first target echo B is applied with the same global ID as the second target echo B' (G2).

Next, the data estimator 55 of the TT information control server 41 performs an estimation on data of the target object (position, speed, course, etc.) based on the TT information received by the receiver 51. The estimation is performed when a plurality of target echoes indicating the same target object exist. In this embodiment, the estimation is performed on the target object B. Hereinafter, examples of estimation of the data of the target object performed by the data estimator 55 are explained with reference to FIGS. 7A and 7B. For example, as shown in FIG. 7A, the data estimator 55 can estimate the speed of the target object by averaging the speed detected by the second radar device 1 and the speed detected by the second radar device 2 therebetween. Further, alternative to this configuration, as shown in FIG. 7B, by setting a priority order of the radar antennas in advance, the speed acquired by the radar antenna with higher priority may be used preferentially. The priority order of the radar antennas may be determined based on performances of the radar antennas, according to the installment conditions of the radar antennas, or changed according to the distances of the target object from the radar antennas. For example, when the target object is in close distance, the first radar device 1 may have the higher priority, and when the target object is in far distance, the second radar device 2 may have the higher priority. Further, when three or more radar devices are installed, the estimation of the speed may be performed by comparing the speeds detected by the radar apparatuses with each other while excluding the speed that differs greatly from the other speeds and using only the highly reliable speeds. The position and course of the target object may be estimated similarly to the estimation of the speed. As above, by estimating the speed based on the plurality of data acquired by the plurality of radar devices, the position, speed and course of the target object can be estimated accurately.

Next, the transmitter 56 of the TT information control server 41 transmits back to the TT information control client 21, the global ID applied by the global ID applier 54, and the estimated position, speed and course of the target object estimated by the data estimator 55.

The TT information control client 21 transmits the global ID and the estimated position and speed of the target to the TT information storage 22 to store therein. Here, the position and speed acquired by the TT information acquirer 13 may be updated by the estimated position and speed estimated by the data estimator 55, or may remain as they are.

Figure 8A:
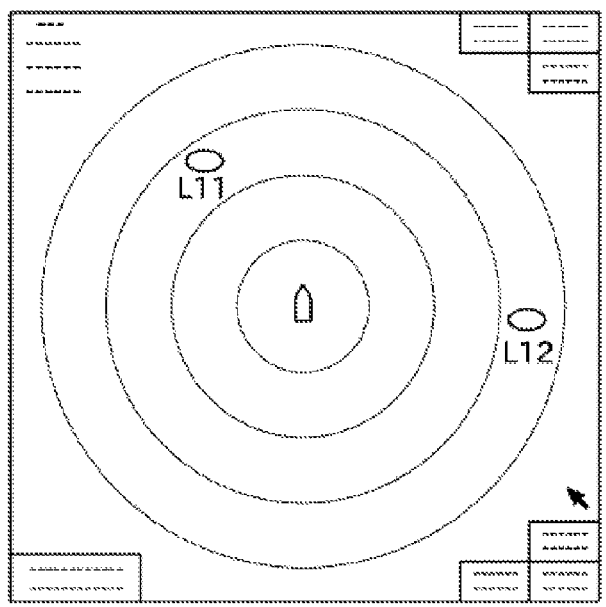
FIG. 8A is a view showing a display example of target echoes in the first radar device according to the conventional case.
Figure 8B:
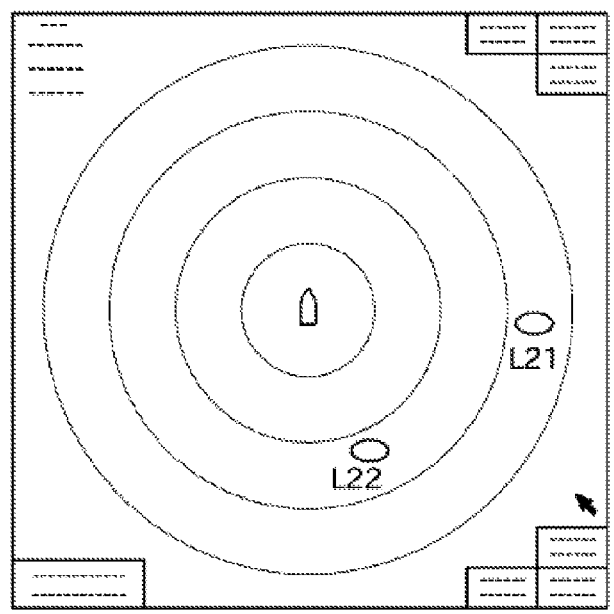
FIG. 8B is a view showing a display example of target echoes in the second radar device according to the conventional case.

The display unit 23 displays the target echoes based on the information obtained as above. Hereinafter, the display on the display unit 23 is explained with reference to FIGS. 8 to 10. FIGS. 8A and 8B are views showing display examples of the target echoes according to the conventional case. FIGS. 9A, 9B, 10A and 10B are views showing display examples of the target echoes according to this embodiment.

Firstly, the display example of the target echoes in the conventional case is explained. Conventionally, an ID unified between the radar devices has not been used (only the local ID was used). Therefore, as shown in FIGS. 8A and 8B, the different IDs are applied to the target echoes indicating the same target object (target object B) in the display. In this case, a correspondence relation between the target echoes displayed in the two radar images has been difficult to be grasped instantly.

Figure 9A:
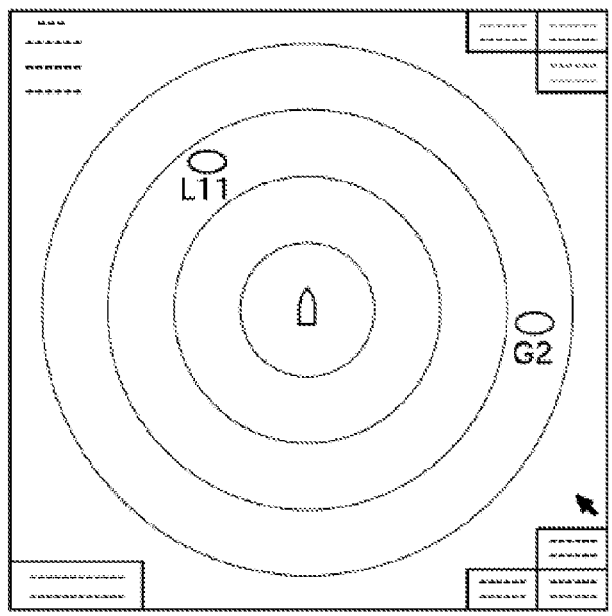
FIG. 9A is a view showing a display example of target echoes in the first radar device in a first display mode of the embodiment.
Figure 9B:
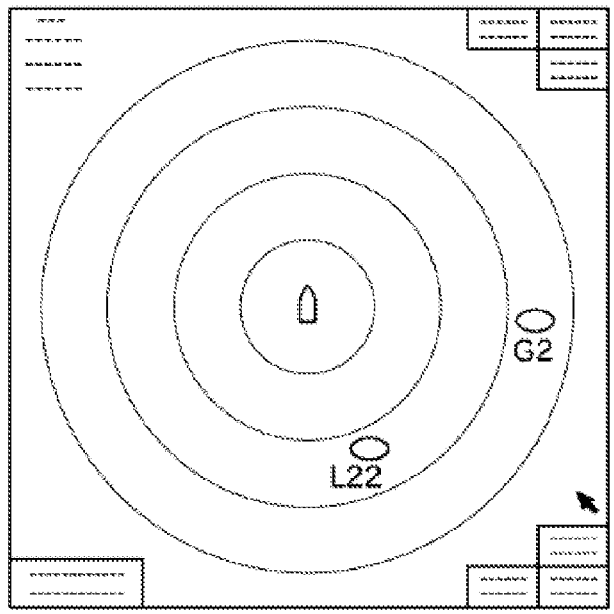
FIG. 9B is a view showing a display example of the target echoes in the second radar device in the first display mode of the embodiment.

On the other hand, in this embodiment, the global ID that is the ID unified between the radar devices is used. Therefore, as shown in FIGS. 9A and 9B, the same ID is applied to the target echoes indicating the same target object (target object B) in the display. Thus, the information that is in match can be provided to the operator. Note that, with the TT information control system 100, the display units 23 and 43 can switch the display between two display modes.

As shown in FIGS. 9A and 9B, in the first display mode, only the target echoes acquired by the device concerned are displayed. In this display mode, the target object that is currently under detection by the device concerned can easily be grasped. Further, it can be prevented that a plurality of target objects detected only by the other radar device are also displayed and the target object which the operator wants to see is difficult to be recognized on the display unit.

Figure 10A:
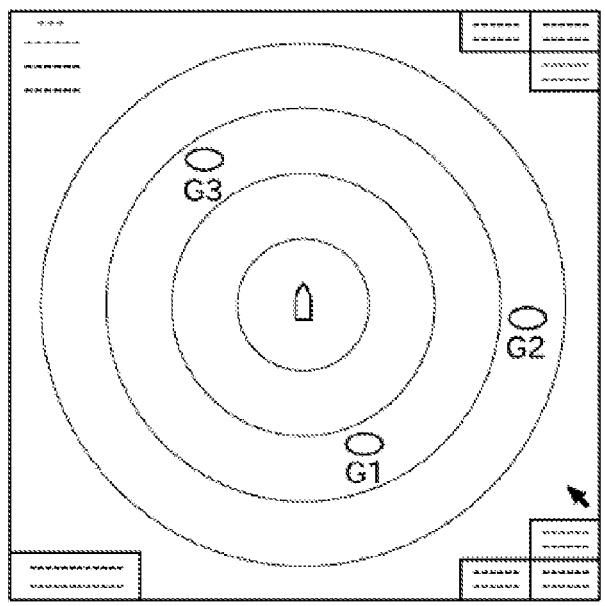
FIG. 10A is a view showing a display example of the target echoes in the first radar device in a second display mode of the embodiment.
Figure 10B:
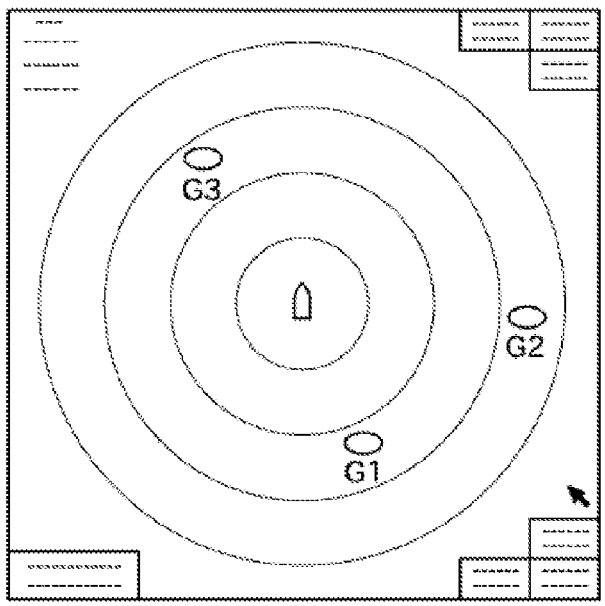
FIG. 10B is a view showing a display example of the target echoes in the second radar device in the second display mode of the embodiment.

As shown in FIGS. 10A and 10B, in the second display mode, the target echoes acquired by the device concerned and the target echoes acquired by the other radar device are both displayed. This display mode allows the information of around the device concerned to be grasped in detail by effectively using the plurality of radar devices.

Further, the operator can set the kind of ID (either one of or both the local ID and the global ID) and the target object to which the set kind of ID is to be applied. For example, in FIGS. 9A and 9B, each of the display units 23 and 43 displays the target object acquired only by the radar device concerned (the target object A for the first radar device 1 and the target object C for the second radar device 2) with the local ID applied thereto. On the other hand, the target object acquired by both the radar devices (the target object B) is displayed with the global ID applied thereto. In this embodiment, the target echo acquired only by the radar device concerned and the target object acquired by both the radar devices can be discriminated from each other in the display.

Note that, alternative to the above configuration, all of the target echoes may be applied with both the local ID and the global ID and displayed. Further alternatively, as shown in FIGS. 10A and 10B, all of the target echoes may be applied with the global ID and displayed on the display units 23 and 43.

Figure 11A:
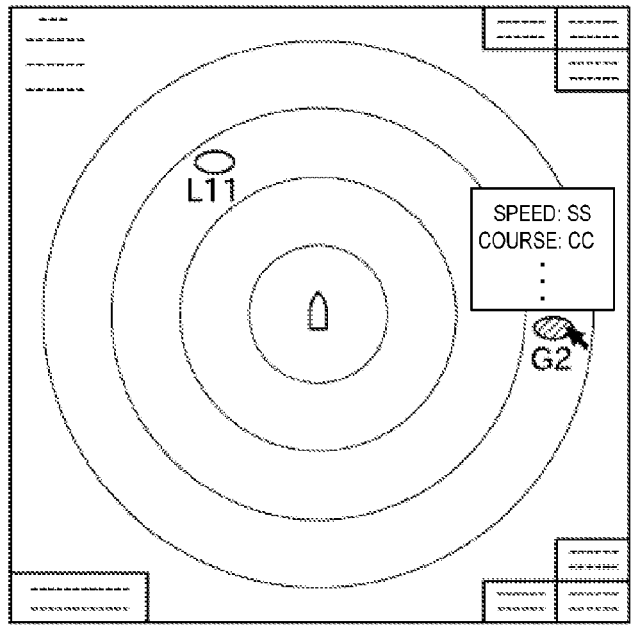
FIG. 11A is a view showing that a display unit of the first radar device cooperates with that of the second radar device.
Figure 11B:
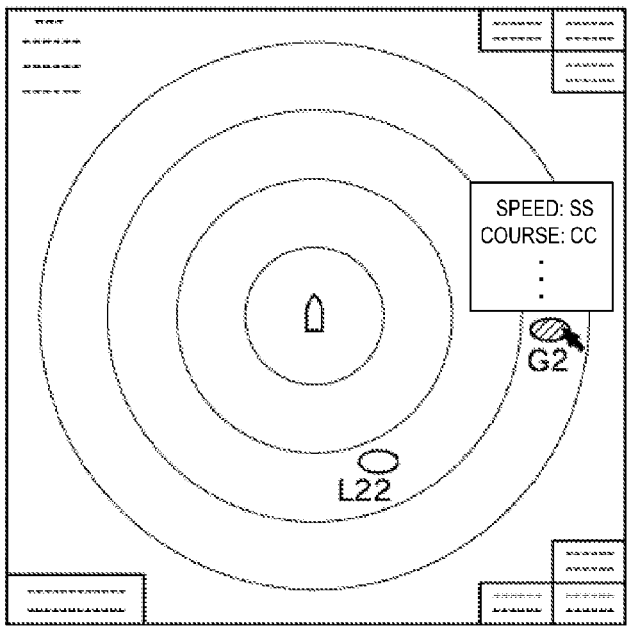
FIG. 11B is a view showing that a display unit of the second radar device cooperates with that of the first radar device.

Further, the operator may select a desired target echo by using a user interface (e.g., a mouse or a trackball) to move a pointer displayed on the display units 23 and 43 and clicking the desired target echo. The selected target echo is displayed in a different mode from other echoes, for example, by being highlighted or shaded (see FIGS. 11A and 11B). Further, the display units 23 and 43 display the numerical information (course, speed, etc.) on the selected echo. The numerical information displayed here may include the estimated position and speed estimated by the data estimator 55, or may include the position and speed acquired by the TT information acquirer 13. Alternatively, both the estimated position and speed, and the position and speed acquired by the TT information acquirer 13 may be displayed.

Further, for example, when the target echo is selected on the display unit 23 of the first radar device 1, the TT information control client 21 informs to the TT information control server 41 that the target echo is selected, by transmitting the information (e.g., the ID) on the selected target echo. The second radar device 2 changes the mode of displaying the target echo that is currently displayed on the display unit 43 by, for example, highlighting or shading, based on the transmitted information. Further, similarly to the display unit 23 displaying the numerical information (course, speed, etc.) on the selected echo, the display unit 43 displays the numerical information (course, speed, etc.) on the selected echo (see FIGS. 11A and 11B).

Note that, when the target echo is selected on the display unit 43 of the second radar device 2, similar to the case above, the target echo is highlighted or shaded and the numerical information is displayed on the display unit 23 of the first radar device 1.

Thus, in the TT information control system 100, when the target echo detected by both the first and second radar devices 1 and 2 is selected by one of the radar devices, the other radar device is informed that the target echo is selected. Then, the informed other radar device displays the numerical information on the target echo.

Note that, the method of selecting the target echo is not limited to using the user interface, such as the mouse or the trackball, and may be using other kinds of user interfaces, such as, cursor keys and enter key. The method of displaying the selected target echo may be other than highlighting or shading.

Figure 12:
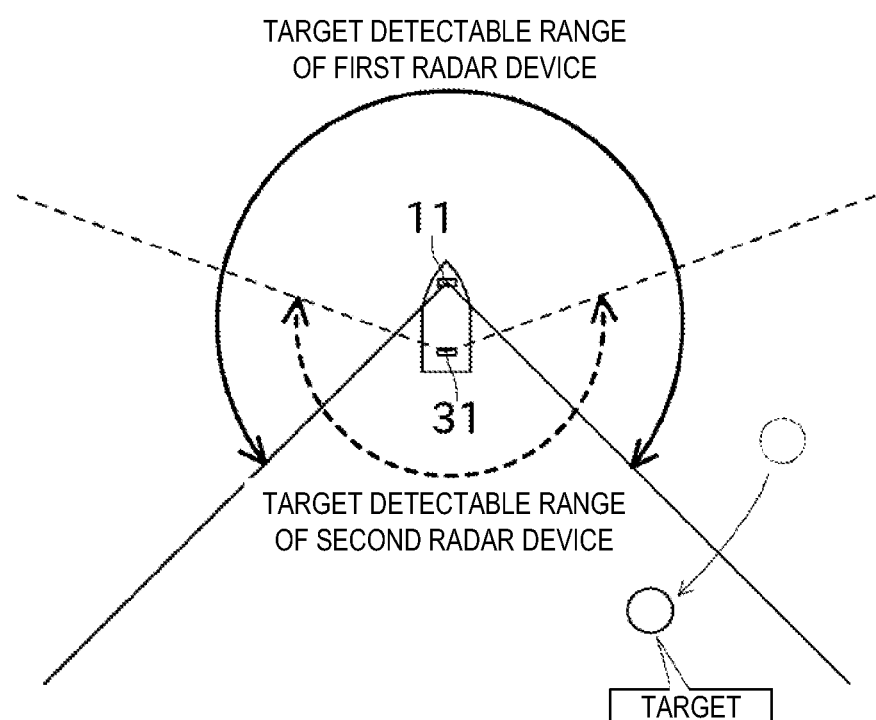
FIG. 12 is a view explaining a situation where tracking information is required to be taken over.

Next, taking over of tracking information is explained. As described above, each of the first and second radar devices 1 and 2 has the limited detectable range of the target object. Therefore, there is a case where the target echo may reach outside the target object detectable range of itself while being tracked. FIG. 12 shows a situation where a target object D reaches outside the target object detectable range of the first radar device 1. Note that, each radar device grasps the target object detectable range of itself. When the radar device determines that, based on the course of the target echo currently tracked by the radar device, it shortly cannot detect the target echo currently tracked by itself anymore, the radar device transmits the situation to the TT information control server 41. In the case of FIG. 12, when the number of the radar devices in the TT information control system 100 is three or more, and when the situation where the first radar device 1 shortly cannot detect the target object D is transmitted to the TT information control server 41, the TT information control server 41 determines whether the target object D, which is already stored in the TT information memory 52, is also tracked by any of the other radar devices.

When the target object D is not tracked by any of the other radar devices, the TT information control server 41 causes the radar device (the second radar device 2), which can detect the target object D, to track the target object. Then, as described above, information on the target object D detected by the second radar device 2 is transmitted to the first radar device 1. In this manner, the first radar device 1 can keep the observation of the target object D by setting the display mode to the second display mode.

On the other hand, when the target object D is tracked by one or more of the other radar devices, the information on the target object D is kept transmitted to the first radar device 1 as described above. Therefore, the TT information control server 41 does not particularly perform any processing other than the above.

As explained above, the TT information control server 41 includes the receiver 51, the determiner 53, the global ID applier 54, the data estimator 55, and the transmitter 56. The receiver 51 receives, from the first radar device 1, the TT information obtained by the target tracking performed based on the echo received by the radar antenna 11, and the receiver 51 further receives, from the second radar device 2, the TT information obtained by the target tracking performed based on the echo received by the radar antenna 31. The determiner 53 determines whether both the target echoes of which information contained in the TT information indicate the same target object. Based on the determination result from the determiner 53, the global ID applier 54 applies the same ID to the target echoes indicating the same target object. When the target echoes indicate the same target object, the data estimator 55 estimates the position and speed of the target object based on the positions and speeds of the target echoes. The transmitter 56 transmits to the first and second radar devices 1 and 2, the global ID applied by the global ID applier 54 and the estimated position and speed of the target object estimated by the data estimator 55. The first and second radar devices 1 and 2 display the target echoes with the global ID applied from the global ID applier 54.

In this manner, the same ID (global ID) can be applied to the target echoes indicating the same target object. Therefore, the target echoes indicating the same target object can be displayed with the same ID between the different radar devices. Thus, the information that is in match can be provided to a plurality of operators.

As above, the suitable embodiment of the present invention is explained. The above configuration may be modified as follows, for example.

In this embodiment, the target echoes are displayed with the global ID applied thereto; however, the target echoes set to have the same global ID may be displayed in the same color and/or mark so that it is clear whether they indicate the same target object.

The connection between the radar devices is not limited to be wired and may be wireless. Further, alternative to connecting the radar devices by the LAN, for example, a WAN, such as internet, may be used for the connection.

In this embodiment, the radar devices to be mounted in the ship is exemplary explained; however, the present invention may be applied to radar devices to be amounted on another movable body (e.g., aircrafts). Further, the present invention may also be applied to radar devices installed in, for example, a lighthouse, a strait, and a port, which detect the surrounding situation by radar echoes.

The radar devices constituting the TT information control system 100 is not necessarily installed in the same ship, and may be provided to different ships separately. Further, if the radar devices are not be installed in a movable body, the devices may be installed in different locations.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A radar device comprising:
    a receiver configured to receive data relating to target echoes received by a radar antenna, and to receive data relating to target echoes received by an other radar device;
    an acquirer configured to acquire data relating to the target echoes received by the radar antenna, by tracking the target echoes;
    a determiner configured to determine whether the target echoes acquired by the radar antenna and the target echoes acquired from the other radar device indicate the same target object;
    a global ID applier configured to apply a global ID, the global ID being an ID assigned for the target echoes indicating a single target object by applying the same ID to the target echoes when the determiner determines that the target echoes indicate the same target object;
    a local ID applier configured to apply a local ID, the local ID being an ID assigned for the target echoes acquired by the radar antenna indicating a single target object;
    a transmitter configured to transmit the global ID to the other radar device so as to inform whether the target echoes displayed by the radar device and the other radar device, respectively, indicate the same target object; and
    a display unit configured to display the target echoes and selectively displaying the global ID or the local ID based on a display mode.

2. The radar device of claim 1, wherein the determiner determines whether the target echoes indicate the same target object, based on at least one of positions, speeds, and courses of the target echoes.

3. The radar device of claim 1, further comprising a data estimator configured to estimate a data of the target echoes, when the target echoes indicate the same target object, data of the same target object based on at least one of the data of the target echoes, wherein the transmitter transmits the data of the same target object estimated by the data estimator to the other radar devices.

4. The radar device of claim 3, wherein the data estimator estimates the data of the same target object by averaging the data of the target echoes.

5. The radar device of claim 3, wherein a priority order is set between the radar antennas, and the data estimator uses either one of the data of the target echoes obtained from the radar antennas as an estimated value of the data of the same target object based on the priority order.

6. The radar device of claim 1, wherein when the radar devices detects that the target echo currently tracked thereby is close to reach outside a target detectable range of the radar device, a determination of whether this target object is tracked by the other radar device is performed, and when this target object is not tracked by the other radar device and if the other radar device is able to detect this target object, the other radar device is instructed to start tracking this target object.

7. The radar device of claim 1, wherein according to the display mode only the target echo acquired by one of the radar devices is displayed.

8. The radar device of claim 1, wherein according to the display mode both the target echo acquired by the radar devices and a target echo acquired by the other radar device are displayed.

9. The radar device of claim 1, wherein according to the display mode both the target echo acquired by only one of the radar devices and a target echo acquired by the other radar device are displayed so that the target echoes are discriminated from each other.

10. The radar device of claim 9, wherein the according to the display the target echo acquired by the radar devices and the other radar device with the global ID and the target echo acquired by the radar device with the local ID are displayed.

11. The tracking radar device of claim 1, wherein when the target echo detected by both the radar device and the other radar device is selected by the radar device, and the selection of the target echo is informed to the other radar device.

12. The radar device of claim 1, wherein when the target echo detected by both the radar device and the other radar device is selected by the radar device, numerical information on the selected target echo is displayed by on the display unit, and the selection of the target echo is informed to the other radar device.

13. The radar device of claim 1, wherein a reference position for a relative position of the target echo is set, and the relative position with respect to the reference position is calculated based on a position of the radar antenna and the reference position.

14. The radar device of claim 1, wherein a terrestrial reference position of the target echo is calculated based on a terrestrial reference position of the radar antenna.

15. The radar device of claim 1, wherein the global ID applier is further configured to apply different IDs respectively for the target echoes acquired by the radar antenna and the target echoes acquired from the other radar device indicating a different target object.

16. A radar device comprising:
    a radar antenna;
    an acquirer configured to acquire data relating to target echoes received by the radar antenna, by tracking the target echoes;
    a communicator configured to transmit the target echoes to an other radar device where data relating to the target echoes is controlled, and to receive, from the other radar device a global ID applied by a global ID applier, the same global ID being assigned for every target object; and a local ID applier for applying a local ID, the local ID being an ID assigned for the target echoes acquired by the radar antenna indicating a single target object;

a display unit for displaying the target echoes and selectively displaying the global ID or the local ID based on a display mode.

17. The radar device of claim 16, wherein the communicator is configured to receives a different global ID applied by the global ID applier, the different global ID being assigned by the global ID applier respectively for the target echoes acquired by the radar antenna and the target echoes acquired from the other radar device indicating a different target object.

18. A method of managing tracking information, comprising:

receiving, from two radar devices, data relating to target echoes received by a radar antenna of one of the radar devices, and data relating to a target echo received by a radar antenna of the other radar device, the data being obtained from tracking the target echoes, respectively;

determining whether the target echoes indicate the same target object;

applying an global ID, the global ID being an ID assigned for the target echoes indicating a single target object by applying the same ID to the target echoes when the determining determines that the target echoes indicate the same target object;

applying a local ID, the local ID being an ID assigned for the target echoes acquired by the radar antenna indicating a single target object;

transmitting the global ID to the other radar device so as to inform the other radar device whether the target echoes displayed by the radar devices respectively, indicate the same target object; and displaying the target echoes and selectively displaying the global ID or the local ID based on a display mode.

19. The method of managing tracking information of claim 18, wherein the applying the global ID includes applying different IDs respectively for the target echoes acquired by the radar antenna and the target echoes acquired from the other radar device indicating a different target object.

* * * * *